United States Patent
Wang et al.

(10) Patent No.: US 7,197,494 B2
(45) Date of Patent: Mar. 27, 2007

(54) METHOD AND ARCHITECTURE FOR CONSOLIDATED DATABASE SEARCH FOR INPUT RECOGNITION SYSTEMS

(75) Inventors: Kuansan Wang, Bellevue, WA (US); David G. Ollason, Seattle, WA (US); Siddharth Bhatia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 10/411,059

(22) Filed: Apr. 10, 2003

(65) Prior Publication Data

US 2004/0073540 A1 Apr. 15, 2004

Related U.S. Application Data

(60) Provisional application No. 60/418,392, filed on Oct. 15, 2002.

(51) Int. Cl.
*G06F 17/30* (2006.01)
*G06F 7/00* (2006.01)

(52) U.S. Cl. .............................................. 707/3; 707/4
(58) Field of Classification Search ................. 707/3, 707/10, 100; 704/236, 257
See application file for complete search history.

(56) References Cited

U.S. PATENT DOCUMENTS

| | | | |
|---|---|---|---|
| 6,499,013 B1 * | 12/2002 | Weber | 704/257 |
| 6,556,963 B1 * | 4/2003 | Tetzlaff | 704/9 |
| 6,665,640 B1 * | 12/2003 | Bennett et al. | 704/257 |
| 6,862,713 B1 * | 3/2005 | Kraft et al. | 715/728 |
| 6,877,001 B2 * | 4/2005 | Wolf et al. | 707/3 |
| 6,882,970 B1 * | 4/2005 | Garner et al. | 704/236 |
| 6,934,675 B2 * | 8/2005 | Glinski et al. | 704/9 |
| 7,024,364 B2 * | 4/2006 | Guerra et al. | 704/270 |
| 2004/0181461 A1 * | 9/2004 | Raiyani et al. | 705/26 |
| 2004/0260543 A1 * | 12/2004 | Horowitz et al. | 704/221 |

OTHER PUBLICATIONS

SAPI 5.0 Overview, Microsoft Windows CE. NET 4.2, Microsoft Corporation, 2000.

* cited by examiner

*Primary Examiner*—Sam Rimell
*Assistant Examiner*—Alicia Lewis
(74) *Attorney, Agent, or Firm*—Theodore M. Magee; Westman, Champlin & Kelly, P.A.

(57) ABSTRACT

A method and system are provided for recognizing user input. User input is applied to at least one model to identify at least one decoded value found in a grammar. The decoded value and at least one database value stored in the grammar are then returned. The database value corresponds to a database value found in a database that is separate from the grammar. Under one embodiment, the database is associated with an application that accesses database values in the database. Under a further embodiment, two database values are returned with the decoded value where one of the database values corresponds to a database value in a first database and the other database value corresponds to a database value in a second database.

10 Claims, 5 Drawing Sheets

```
<rule name="Person">                    — 400

<p>Kuansan Wang
        <output>                        — 408
404
            <first_name>Kuansan</first_name>

<last_name>Wang</last_name>

<phone>555-1234</phone>     — 412        414

<recorded_voice>http:/www.appsecure.com/kw.wave</recorded_voice>

</output>                       — 410

</p>

<p>Bill Somename
        <ouput>
406
            <first_name>Bill</first_name>

<last_name>Somename</last_name>

<phone>555-2345</phone>

<recorded_voice>http:/www.appsecure.com/bs.wave</recorded_voice>

</output>

</p>

<p>
     .
     .
     .                                  — 402
</rule>
```

METHOD AND ARCHITECTURE FOR CONSOLIDATED DATABASE SEARCH FOR INPUT RECOGNITION SYSTEMS

REFERENCE TO RELATED CASES

The present application claims priority from U.S. Provisional application 60/418,392 filed on Oct. 15, 2002 and entitled "Method and Architecture for Consolidated Database Search for Input Recognition Systems."

BACKGROUND OF THE INVENTION

The present invention relates to methods and systems for defining and handling user/computer interactions. In particular, the present invention relates to systems that allow for grammar-based recognition of user inputs.

For many years, there has been a great deal of interest in expanding the types of inputs that computing devices can accept and interpret. Examples of these inputs include speech, gestures, handwriting, and natural language. Each of these input types have proven to be difficult to implement because of variations in the way people speak, write, and gesture. Because of these variations, there is always some ambiguity as to what the user was actually trying to communicate.

To determine the meaning of an ambiguous input, it is common to apply the input to one or more models that predict the likelihood of various possible meanings given the input. To reduce the amount of searching that must be performed when using these models, the number of possible meanings that can be represented by the input is limited to a selected grammar. For example, in speech and handwriting recognition, the grammar is a set of allowable word sequences.

The models used to decode such ambiguous inputs often require a large amount of run-time memory and a computing-device with a high-speed processor. As a result, the adoption of such inputs in many computer applications has been limited. Thus, a system is needed that allows for broader adoption of grammar-based recognition while at the same time limiting the amount of computing resources needed to interact with the user.

SUMMARY OF THE INVENTION

A method and system are provided for recognizing user input. In the method, user input is applied to at least one model to identify at least one decoded value found in a grammar. The decoded value and at least one database value stored in the grammar are then returned. The database value corresponds to a database value found in a database that is separate from the grammar. Under one embodiment, the database is associated with an application that accesses database values in the database. Under a further embodiment, two database values are returned with the decoded value where one of the database values corresponds to a database value in a first database and the other database value corresponds to a database value in a second database.

DETAILED DESCRIPTION OF ILLUSTRATIVE EMBODIMENTS

The present invention provides a distributed computing system in which a user agent acts as an interface for an application that runs as a separate computing process. In the distributed system, the user agent is able to communicate with a recognition process that is separate from the application to obtain recognition services for user inputs that need to be decoded.

One aspect of the present invention is that the grammar used by the recognition process includes database entries associated with one or more applications. As a result, when the values represented by the input are decoded, the database entries associated with those values are returned to the user agent. This reduces the amount of communication traffic between the user agent and the application because the user agent does not have to relay the decoded input values to the application in order to access the database values associated with the input. Instead, the user agent receives the database values directly from the recognition process.

Figure 1:
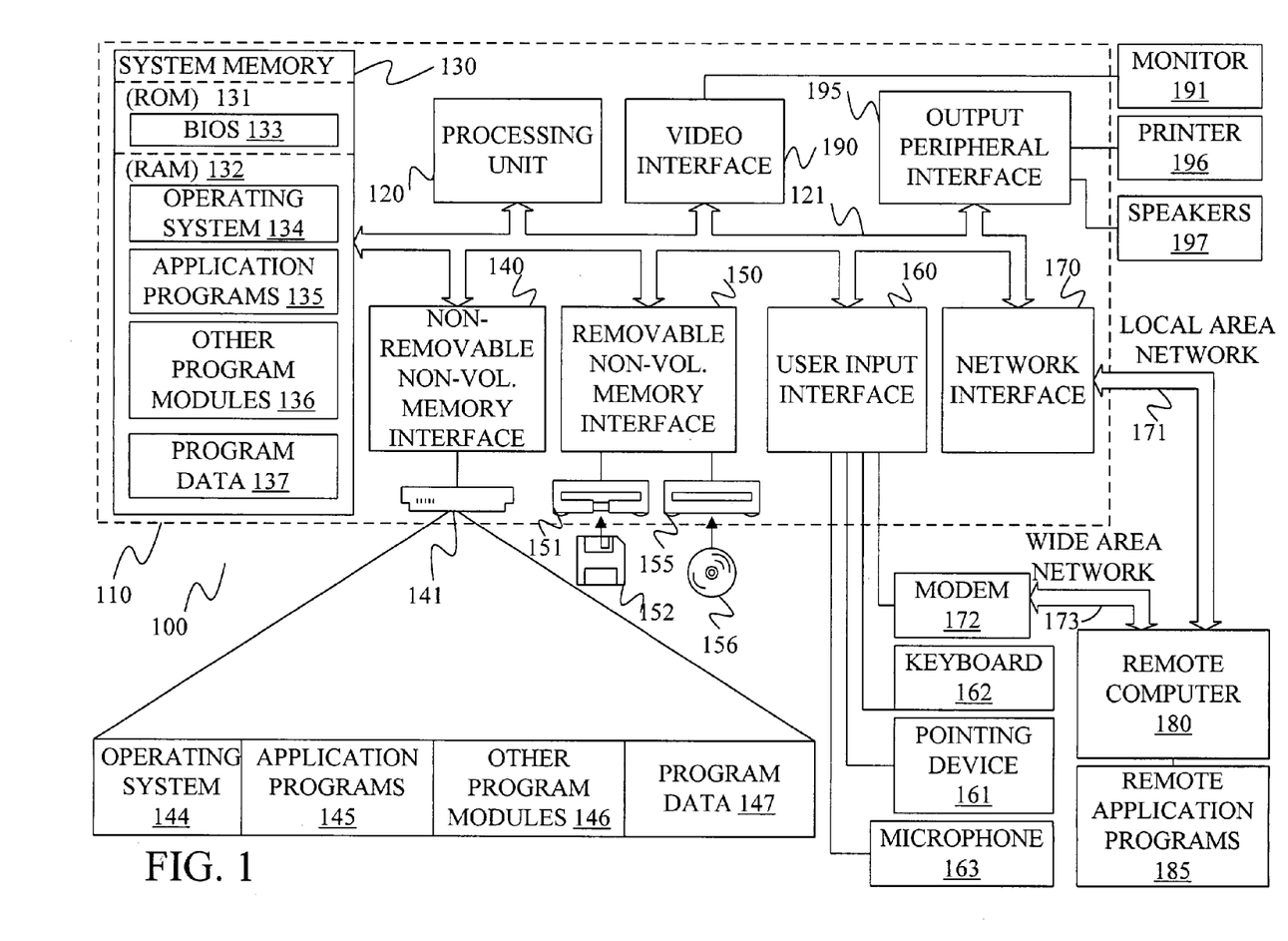
FIG. 1 is a general block diagram of a personal computing system in which a portion of the present invention may be practiced.

FIG. 1 illustrates an example of a suitable computing system environment 100 on which the user agent of the distributed computing system of the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, camera or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
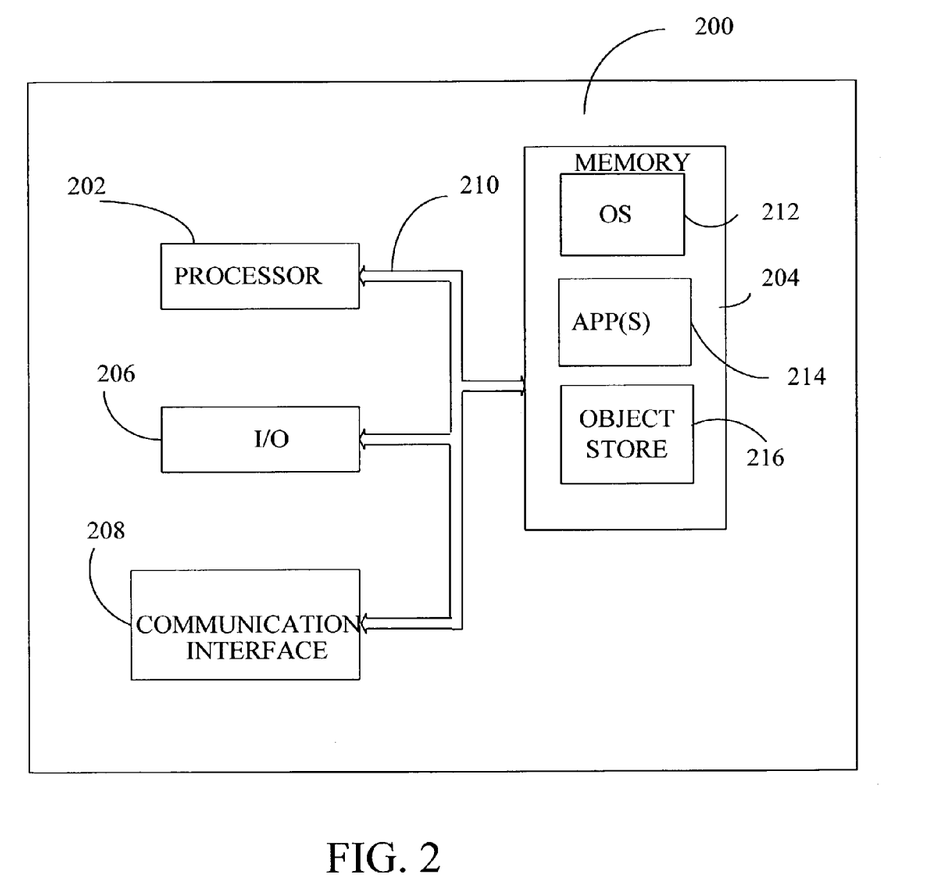
FIG. 2 is a block diagram of a mobile device on which a portion of the present invention may be practiced.

FIG. 2 is a block diagram of a mobile device 200, which is an alternative exemplary computing environment on which the user agent may reside. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information. Through communication interface 208, mobile device 200 may be connected to a remote server, personal computer, or network node. Under the present invention, mobile device 200 is capable of transmitting speech data from the mobile device to a remote computer where it can be decoded to identify a sequence of words.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
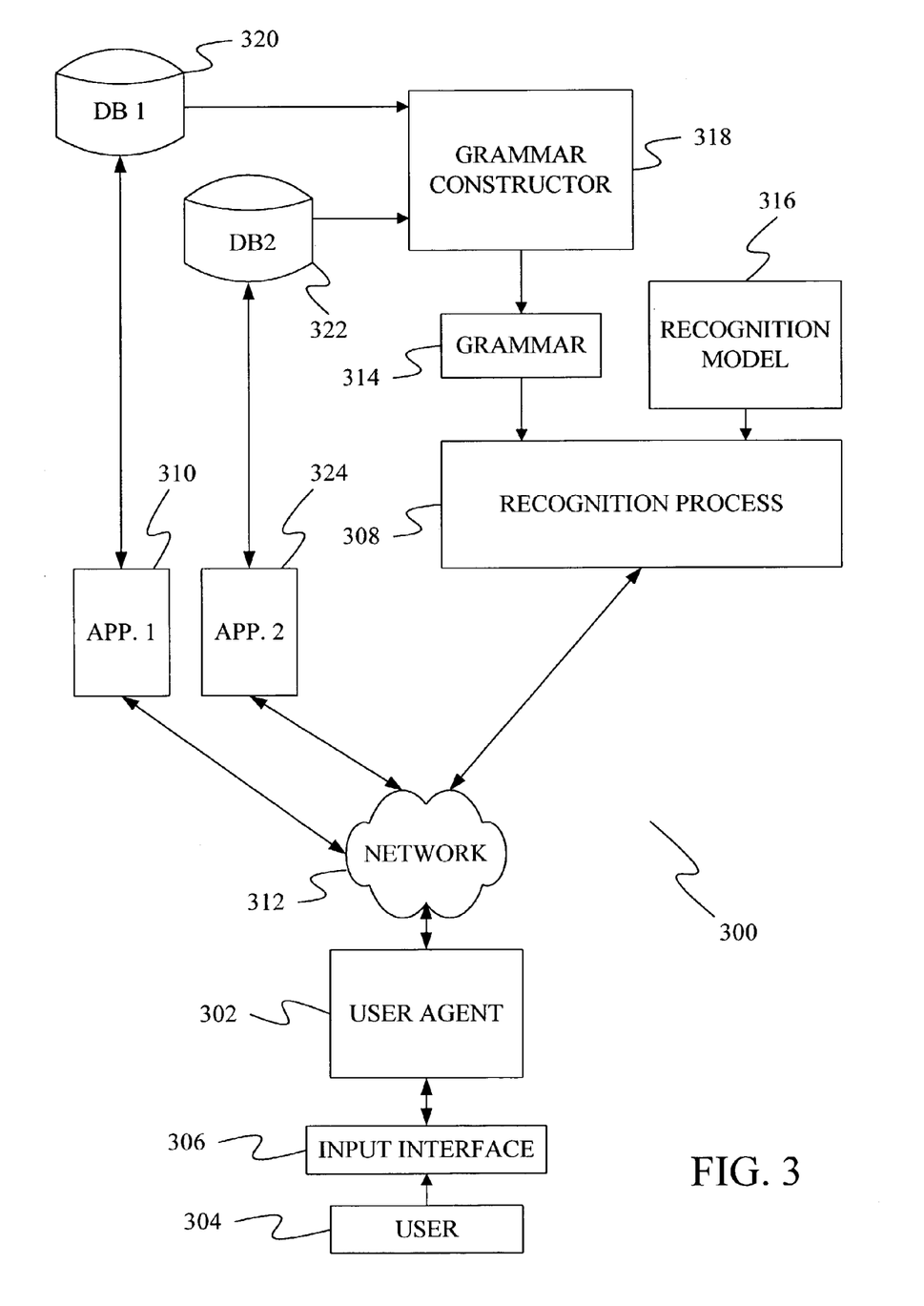
FIG. 3 is a block diagram of a computing architecture under one embodiment of the present invention.

FIG. 3 provides a block diagram of a distributed computing environment 300 under one embodiment of the present invention in which the user agents of FIGS. 1 and 2 appear as user agent 302. User agent 302 is provided with executable instructions by application 310. These instructions typically take the form of script code or embedded code found in mark-up pages such as XML and HTML pages. User agent 302 executes this code to provide an interface to the user. In FIG. 3, application 310 is shown as being connected to user agent 302 through a network 312, which can be a wide-area network, such as the Internet, or a local area network. In other embodiments, application 310 is located on the same computing device as user agent 302. In such embodiments, application 310 is executed as a separate process from user agent 302.

Based on the code it receives from application 310, user agent 302 communicates with a user 304 through one or more input interfaces 306, which can include video capture, microphones, keyboard, touch screens and/or pointing devices. For each input modality that requires interpretation such as handwriting, speech, and gestures, user agent 302 passes the collected input to a recognition process 308. Input modalities may have their own or share a common recognition process. For example, a context free grammar designed for speech inputs may be just as applicable to typed text, therefore the recognition process for typed text can utilize portions of the infrastructure designed for speech processing. The information passed to recognition process 308 can take the form of actual digitized values collected through the interface or selected features representing the content of those digitized values. For example, for speech input, the information passed to recognition process 308 can include digital samples of the speech signal or Cepstral feature vectors representing the spectral content of frames of the speech signal.

In FIG. 3, recognition process 308 is shown as being connected to user agent 302 through a network 312, which can be a wide-area network or a local area network. In other embodiments, recognition process 308 is located on the same computing device as user agent 302 but is executed as a separate process from user agent 302.

Recognition process 308 decodes the input to identify a set of values represented by the input. The input is decoded using a set of recognition models 316 and a recognition/semantic grammar 314. Recognition models 316 provide likelihoods for possible values that can be represented by the input while grammar 314 limits the possible values that can be provided by the input. For example, for speech recognition, grammar 314 provides a set of words or word sequences that are allowable in the input.

In one embodiment, recognition/semantic grammar 314 is written in a tagged mark-up language. An example of a portion of a recognition/semantic grammar 314 is shown in FIG. 4.

Figure 4:
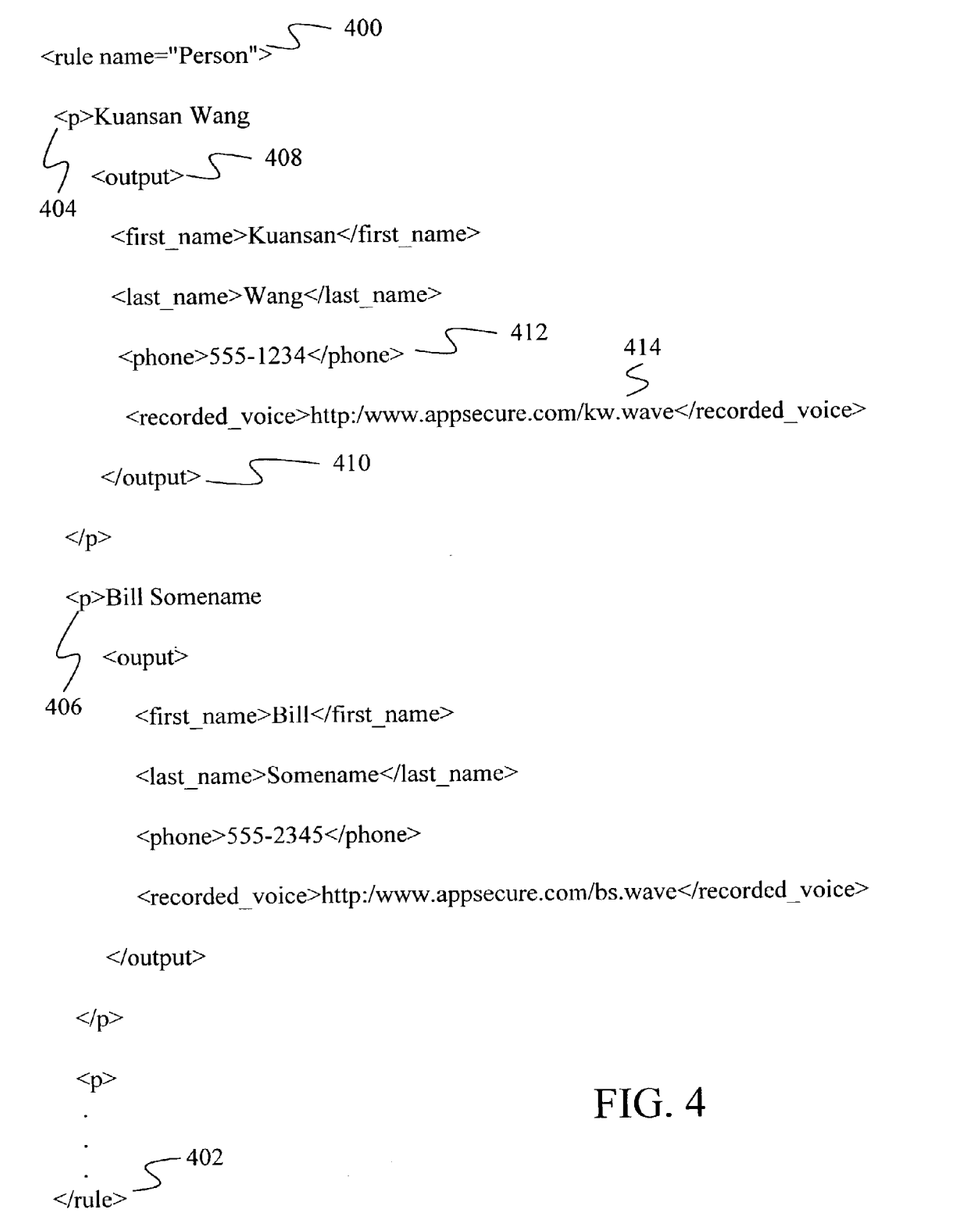
FIG. 4 is an example of a portion of a grammar under one embodiment of the present invention.

In FIG. 4, the grammar is divided into a collection of rules, with each rule embedded between a respective set of <Rule> tags. For example, the "person" rule is found between rule tags 400 and 402. Allowable sequences of words for the grammar of FIG. 4 are found after <p> tags. For example, the word strings "Kuansan Wang" and "Bill Somename" after tags 404 and 406, respectively, represent allowed word sequences under the grammar.

Under the present invention, the grammar defines a tagged output structure that is returned to the user along with the recognized words when the input matches an entry in the grammar. In one embodiment shown in FIG. 4, the structure to be returned is found between <output> tags such as tags 408 and 410. Thus, if "Kuansan Wang" is recognized from the input, the tagged structure between tags 408 and 410 would be returned to user agent 302 along with the string "Kuansan Wang". Thus, the following mark-up text would be returned:

<recognition_result>Kuansan Wang
   </recognition_result>
   <first_name> Kuansan </first_name>
   <last_name> Wang </last_name>
   <phone> 555-1234 </phone>
   <recorded_voice>
     HTTP:www.appsecure.com/kw.wave
   </recorded_>

In the past, recognition programs returned the recognized input and perhaps some semantic values that were linked to that input in the grammar. However, recognition programs did not return database information that had been taken from a database related to an application.

Under embodiments of the present invention, information is taken from a database associated with an application and is stored in the grammar so that it can be returned with the recognition results. For example, in FIG. 4, the phone number 412 for Kuansan Wang is retrieved from a database 320 associated with directory assistance application 310 and is stored in the <output> tags of grammar 314 so that it can be returned with the recognized text to user agent 302. This reduces the need for a further communication between user agent 302 and application 310 because user agent 302 does not have to relay the recognition results to application 310 in order to retrieve the database information. For example, in the recognition results of "Kuansan Wang", the phone number for Kuansan is provided directly to user agent 302 so that user agent 302 does not have to pass the recognized name "Kuansan Wang" to application 310.

Under embodiments of the present invention, recognition/semantic grammar 314 is constructed by a grammar constructor 318. Under some embodiments, grammar constructor 318 is associated with application 310 and thus is written to provide a grammar that is optimized for application 310. In other embodiments, grammar constructor 318 is not directly affiliated with any one particular application but instead is written to support a number of different applications. In most embodiments, grammar constructor 318 accesses database 320 using low priority queries. This minimizes the impact of grammar construction on applications that are currently utilizing the database. In addition, grammar constructor 318 is typically not continually running but instead is run periodically to update the data in grammar 314. The amount of time between updates to grammar 314 is a design choice based on how often the data in the grammar changes, how critical it is that the user agent be given the correct information, and the impact that grammar construction has on the performance of the application. Note that when grammar 314 is updated, the database values can be changed without changing the allowed recognition strings.

Under a further embodiment, grammar constructor 318 generates recognition/semantic grammar 314 by retrieving data from at least two databases associated with two different applications. For example, grammar constructor 318 forms grammar 314 from data in database 320 associated with application 310 and database 322 associated with application 324. This provides a simple way to give user agent 302 access to data associated with more than one application. For example, in the grammar of FIG. 4, phone number 412 is found in database 320 associated with directory assistance application 310. However, the location 414 of a WAV file containing a voice recording of the person saying their own name is found in database 322 associated with a unified messaging application 324.

In the past, it has been difficult to redesign an application to access the data of a second application while maintaining the performance levels desired for the application. For example, it would be difficult to redesign directory assistance application 310 so that it can access database 322 to locate the location of a WAV file based on a user's name while still answering directory assistance questions with the desired speed. By making the grammar construction an "off-line" process that is separate from the applications, the present invention allows database information from more than one application to be easily accessed by a user agent.

Figure 5:
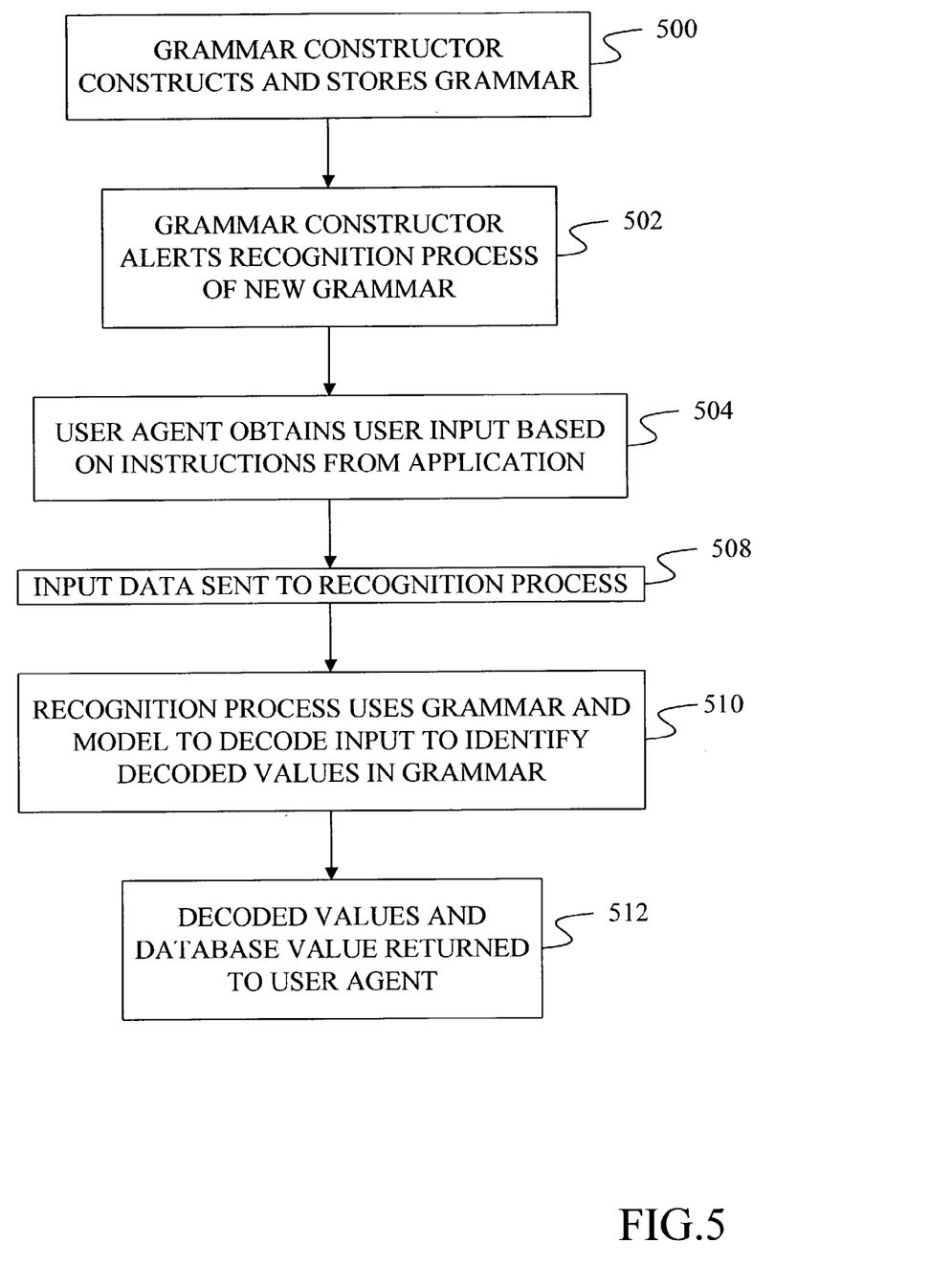
FIG. 5 is a flow diagram for a method under one embodiment of the present invention.

FIG. 5 provides a flow diagram that summarizes the method inherent in the discussion above. At step 500, grammar constructor 318 constructs recognition/semantic grammar 314 by accessing one or more databases 320, 322. Grammar constructor 318 then alerts recognition process 308 to the existence of the new grammar at step 502.

At step 504, user agent 302 obtains user input based on instructions received from application 310. This input is passed to recognition process 308 at step 508. Recognition process 308 uses recognition model 316 and grammar 314 to decode the user input and to identify decoded values in grammar 314 at step 510. Based on the identified decoded values, recognition process 308 returns the decoded values and database values stored in grammar 314 to user agent 302 at step 512.

Although the present invention has been described with reference to preferred embodiments, workers skilled in the art will recognize that changes may be made in form and detail without departing from the spirit and scope of the invention. In particular, although the invention has been described above with reference to XML-based tagged languages, the data constructs may be formed using any of a variety of known formats including tree structures.

What is claimed is:

1. A method of recognizing input, the method comprising:
receiving values representing user input;
applying the input values to at least one model that provides likelihoods of recognition associated with possible recognition values based on the input values to identify at least one recognition value, wherein the possible recognition values that likelihoods are provided for are limited to those recognition values found in a grammar that is separate from the model, the grammar comprising a set of entries, at least one entry comprising possible recognition values and values to be output when the possible recognition values are identified from user input values, the values to be output comprising a first database value and a second database value that are different from the possible recognition values, the first database value corresponding to a database value found in a first database that is separate from the grammar and that is associated with a first application that accesses database values in the first database, and the second database value corresponding to a database value found in a second database that is separate from the grammar and that is associated with a second application that accesses database values in the second database; and
returning the identified recognition value, a first database value and a second database value from an entry in the grammar.

2. The method of claim 1 wherein applying the input values to at least one model comprises applying the input values to an acoustic model.

3. The method of claim 1 wherein returning the recognition value, the first database value and the second database value comprises returning a mark-up language page.

4. The method of claim 1 further comprising updating the grammar by accessing the first database to obtain updated database values.

5. The method of claim 4 wherein updating the grammar further comprises not changing the recognition values in the grammar.

6. A system for decoding user input, the system comprising:
a user agent providing a user interface for obtaining input from a user;

a first database having first database values;

a first application capable of accessing database values in the first database;

a second database having second database values;

a second application capable of accessing database values in the second database;

a recognition grammar, separate from the first database and the second database, comprising a set of entries, at least one entry comprising allowed decoded values that can be represented in the input from a user, at least one associated database value from the first database and at least one associated database value from the second database; and a recognition process capable of identifying at least one decoded value in the grammar by determining likelihoods of recognition associated with decoded values in the grammar based on user input, wherein the recognition process limits the decoded values for which likelihoods are determined to decoded values in the grammar and wherein the recognition process is further capable of returning the identified decoded value, an associated database value that is from the first database and is stored in the grammar and an associated value that is from the second database and is stored in the grammar to the user agent.

7. The system of claim 6 wherein the user agent obtains input from the user based on instructions received from the first application.

8. The system of claim 6 wherein the recognition process returns the decoded value and the database values in a mark-up language page.

9. The system of claim 6 wherein the user agent is executed on a first computing device and the recognition process is executed on a second computing device.

10. The system of claim 9 wherein the first computing device communicates with the second computing device through a network.

* * * * *